(12) United States Patent
Xu et al.

(10) Patent No.: US 11,768,714 B2
(45) Date of Patent: Sep. 26, 2023

(54) ON-CHIP HARDWARE SEMAPHORE ARRAY SUPPORTING MULTIPLE CONDITIONALS

(71) Applicant: Microsoft Technology Licensing, LLC, Redmond, WA (US)

(72) Inventors: Xiaoling Xu, Cupertino, CA (US); Timothy Hume Heil, Woodinville, WA (US); Deepak Goel, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 17/355,114

(22) Filed: Jun. 22, 2021

(65) Prior Publication Data
US 2022/0405151 A1    Dec. 22, 2022

(51) Int. Cl.
*G06F 9/46*    (2006.01)
*G06F 9/52*    (2006.01)

(52) U.S. Cl.
CPC ..................... *G06F 9/52* (2013.01)

(58) Field of Classification Search
CPC ........................................................ G06F 9/52
See application file for complete search history.

(56) References Cited

U.S. PATENT DOCUMENTS

| | | |
|---|---|---|
| 8,327,378 B1 | 12/2012 | Vasanthakumari et al. |
| 8,473,948 B1 | 6/2013 | Le |
| 10,261,926 B2 | 4/2019 | Jia et al. |
| 2002/0161926 A1 | 10/2002 | Cameron |
| 2020/0364088 A1 | 11/2020 | Ashwathnarayan et al. |
| 2020/0401461 A1 | 12/2020 | Verrilli et al. |

FOREIGN PATENT DOCUMENTS

CN    101546275 A    9/2009

OTHER PUBLICATIONS

Downey, Allenb., "The Little Book of Semaphores", Retrieved From https://greenteapress.com/semaphores/LittleBookOfSemaphores.pdf, Jan. 1, 2016, 291 Pages.
"International Search Report and Written Opinion issued in PCT Application No. PCT/US22/029097", dated Jan. 3, 2023, 16 Pages.
(Continued)

*Primary Examiner* — Gregory A Kessler
(74) *Attorney, Agent, or Firm* — Ranjeev Singh; Singh Law, PLLC

(57) ABSTRACT

Hardware semaphores are utilized to increase the speed with which preconditions are evaluated. On an individual basis, each hardware semaphore can implement a binary semaphore or a counting semaphore. Collections of hardware semaphores can be chained together to implement a chain semaphore that can support multiple conditionals. In addition, hardware semaphores can have the capability, not only of generating an interrupt, but, in addition, being able to generate commands, such as to other semaphores. The implementation of a chain semaphore spanning multiple hardware semaphores can be performed by a compiler at compile time or at run time. An integrated circuit chip can comprise multiple execution units, such as processing cores, and individual ones of the execution units can be associated with multiple hardware semaphores, such as in the form of hardware semaphore arrays. A dedicated network-on-chip enables hardware semaphore communication.

20 Claims, 8 Drawing Sheets

(56) References Cited

OTHER PUBLICATIONS

Kamaleldin, et al., "Modular Memory System for RISC-V Based MPSoCs on Xilinx FPGAs", In Proceedings of IEEE 13th International Symposium on Embedded Multicore/Many-core Systems-on-Chip, Oct. 1, 2019, pp. 68-73.

Meadows, et al., "Chapters—Functional Components of Azure RTOS ThreadX", Retrieved from: https://docs.microsoft.com/en-us/azure/rtos/threadx/chapter3, May 19, 2020, 61 Pages.

_US 11,768,714 B2_

ON-CHIP HARDWARE SEMAPHORE ARRAY SUPPORTING MULTIPLE CONDITIONALS

BACKGROUND

Much as a physical semaphore provides an indication as to whether a train can proceed on a track, a semaphore, in the computer science arts, refers to information that indicates whether the execution of a process can proceed in so far as the determined preconditions for the execution of the process have been met. For example, a consumer process may require, as input, data that was output by a producer process. The existence of such data, namely the completion of the execution of the producer process to the extent that the output data is generated, is a precondition for the continued execution of the consumer process. Should the consumer process attempt to continue its execution prior to such a precondition being established, the consumer process will fail due to the nonexistence of the necessary input data. As another example, the consumer process may require a particular portion of memory to be available into which the consumer process may seek to store the output of the consumer process. In such an example, to avoid inadvertent data overwrite, the consumer process should not proceed to execute and store its output in that portion of memory until a preceding process is done utilizing that portion of memory for its own data.

Preconditions can be defined as part of the programming of computer functionality utilizing a human-readable computer programming language, or they can be created as part of the compilation of a program. During compilation of a program from a human-readable computer programming language into computer-executable instructions, software semaphores can be created and/or referenced in order to keep track of the preconditions defined by the human-readable computer programming language or otherwise created by the compilation. Such software semaphores are, themselves, in the form of computer-executable instructions that execute on a processing unit, such as a ubiquitous central processing unit (CPU).

In some instances, however, the execution of a software semaphore can add substantial overhead to the execution of a process whose preconditions are enumerated in the software semaphore. For example, a software semaphore can take one hundred clock cycles or more to execute. If the consuming process itself only takes one hundred clock cycles, the overhead of the software semaphore can double the amount of time required for the consuming process to perform its task.

SUMMARY

Hardware semaphores are utilized to increase the speed with which preconditions are evaluated. On an individual basis, each hardware semaphore can implement a binary semaphore or a counting semaphore. Collections of hardware semaphores can be chained together to implement a chain semaphore that can support multiple conditionals, such as multiple dependencies that are to be satisfied prior to the execution, or continuing execution, of a process. In addition, hardware semaphores can have the capability, not only of generating an interrupt, but, in addition, being able to generate commands, such as to other semaphores. The implementation of a chain semaphore spanning multiple hardware semaphores can be performed by a compiler at compile time or at run time. An integrated circuit chip can comprise multiple execution units, such as processing cores, and individual ones of the execution units can be associated with multiple hardware semaphores, such as in the form of hardware semaphore arrays. A single block can comprise one or more execution units and one or more associated hardware semaphore arrays, and individual elements of the block can communicate with other elements within the same block. Multiple blocks can be aggregated on a single chip, with a dedicated network-on-chip enabling hardware semaphore communication across blocks. Alternatively, or in addition, multiple blocks can be aggregated into a super-block, with the dedicated network-on-chip enabling hardware semaphore communication beyond the super-block to other portions of the chip.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
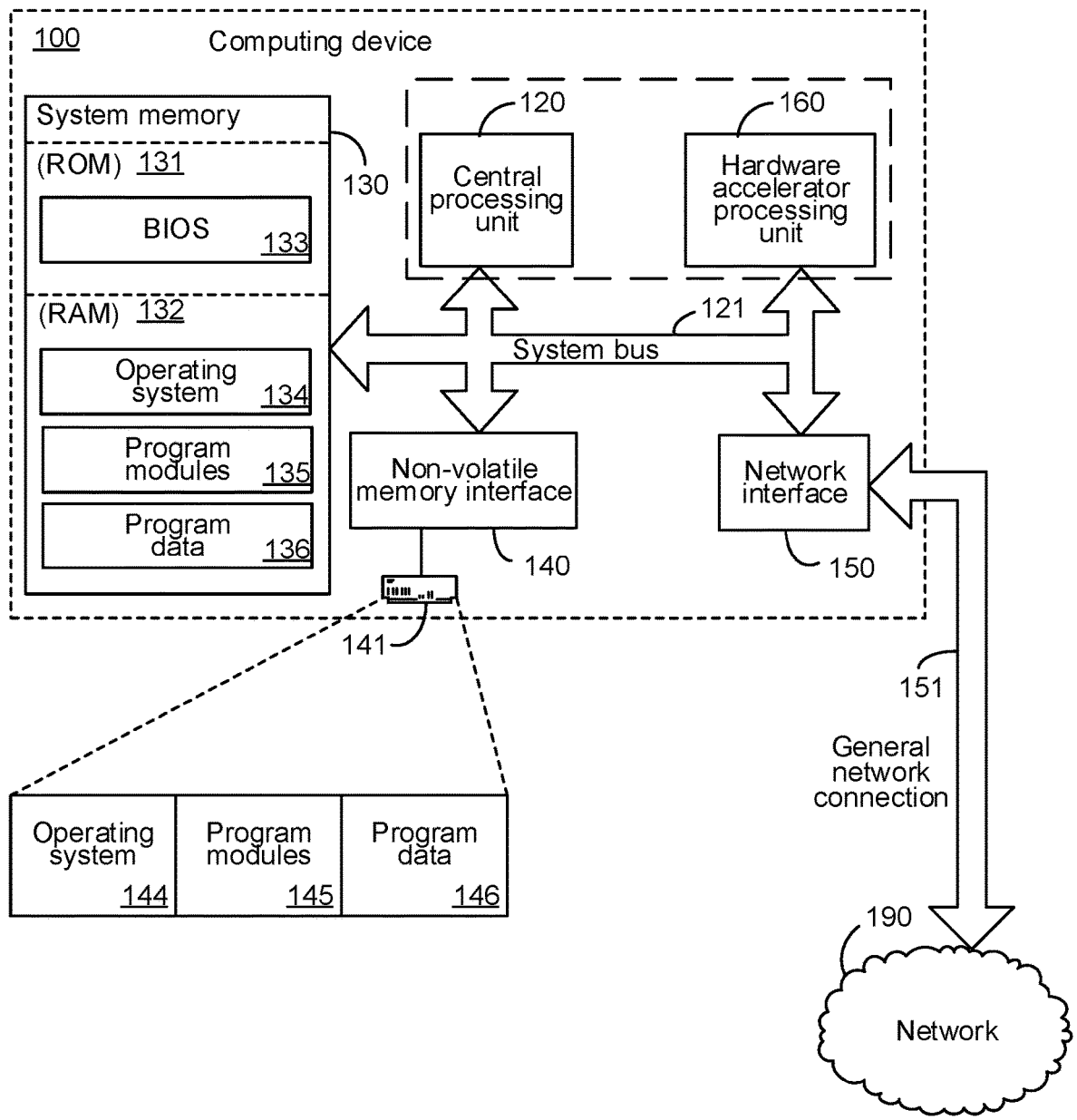
FIG. 1 is a block diagram of an exemplary computing device

The following description relates to increasing the speed with which preconditions are evaluated by utilizing hardware semaphores, whether individually or in a sequence of multiple hardware semaphores. On an individual basis, each hardware semaphore can implement a binary semaphore or a counting semaphore. Collections of hardware semaphores can be chained together to implement a chain semaphore that can support multiple conditionals, such as multiple dependencies that are to be satisfied prior to the execution, or continuing execution, of a process. In addition, hardware semaphores can have the capability, not only of generating an interrupt, but, in addition, being able to generate commands, such as to other semaphores. The implementation of a chain semaphore spanning multiple hardware semaphores can be performed by a compiler at compile time or at run time. An integrated circuit chip can comprise multiple execution units, such as processing cores, and individual ones of the execution units can be associated with multiple hardware semaphores, such as in the form of hardware semaphore arrays. A single block can comprise one or more execution units and one or more associated hardware semaphore arrays, and individual elements of the block can communicate with other elements within the same block. Multiple blocks can be aggregated on a single chip, with a dedicated network-on-chip enabling hardware semaphore communication across blocks. Alternatively, or in addition, multiple blocks can be aggregated into a super-block, with the dedicated network-on-chip enabling hardware semaphore communication beyond the super-block to other portions of the chip.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Before proceeding with a detailed description of the implementation and utilization of hardware semaphores referenced above, a detailed description of an exemplary computing device, which provides context for the descriptions below, is provided with reference to the exemplary computing device 100 shown in FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the computing device 100 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 100. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer content between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 141 is typically connected to the system bus 121 through a non-volatile memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is illustrated as being connected to the general network connection 151 (to a network 190) through a network interface or adapter 150, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 161. It will be appreciated that the network connections shown are the exemplary and other means of establishing a communications link between computing devices may be used.

Although described as a single physical device, the exemplary computing device 100 can be a virtual computing device, in which case the functionality of the above-described physical components, such as the CPU 120, the system memory 130, the network interface 160, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 100 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The exemplary computing device 100 can include one or more hardware accelerator processing units, such as the exemplary hardware accelerator processing unit 160. The exemplary hardware accelerator processing unit 160 can comprise multiple execution units, or processing "cores", to provide for the execution of multiple threads and/or processes in parallel. Such execution units can implement a specialized or custom instruction set, or can be capable of supporting the general-purpose instruction set of the general-purpose central processing unit 120. Although illustrated as separate physical devices, the central processing unit 120 and hardware accelerator processing unit 160 can be part of a single chip, as represented by the dashed lines in FIG. 1. For example, specific course, or a specific portion of the circuitry of a single chip can provide central processing unit capabilities such as those represented by the exemplary central processing unit 120, while other portions of the chip can provide multicore customized processing capabilities, such as those represented by the exemplary hardware accelerator processing unit 160.

As will be recognized by those skilled in the art, the design and manufacture of multiple integrated circuits, such as those of the central processing unit 120 and/or hardware accelerated processing unit 160 involve multiple conceptual layers of detail. In particular, at its most basic form, the circuitry of a processing unit comprises the etching or other depositing and/or manufacturing of electrical pathways onto a semiconductor substrate, such as a silicon substrate. Individual electrical pathways can interact to form processing building blocks, such as transistors. At a higher layer, one or more transistors, in combination with support circuitry, including resistors, capacitors, diodes, and other like support circuitry, can implement rudimentary electrical processing functionality, such as an OR gate, and XOR gate, and the like. At a still higher layer, multiple ones of the circuitry implementing such rudimentary electrical processing functionality are combined together in known combinations to implement still more multiple electrical processing functionality. Consequently, human design of multiple integrated circuits often occurs utilizing known building blocks, such as processing cores, communicational pathways, on-chip memory storage functionality, and the like. While the descriptions below are provided at a level commonly utilized by those of skill in the art, those of skill in the art will further understand that, ultimately, what is described are specific arrangements of circuitry onto a silicon, or other like, substrate. Accordingly, relevant components are referred to in a manner that includes the adjective "circuitry". Thus, for example, the term "hardware semaphore circuitry" refers to the circuitry, implemented utilizing known building blocks, that provides the hardware semaphore functionality described below. As another example, the term "execution unit circuitry" refers to circuitry, implemented utilizing known building blocks, that executes computer executable instructions in accordance with an instruction set supported by such execution unit circuitry. The terms "block circuitry" and "super-block circuitry" refer to circuitry that comprises the hardware semaphore circuitry, execution unit circuitry, communicational pathways, and the like to implement the communications and operations described below.

Figure 2:
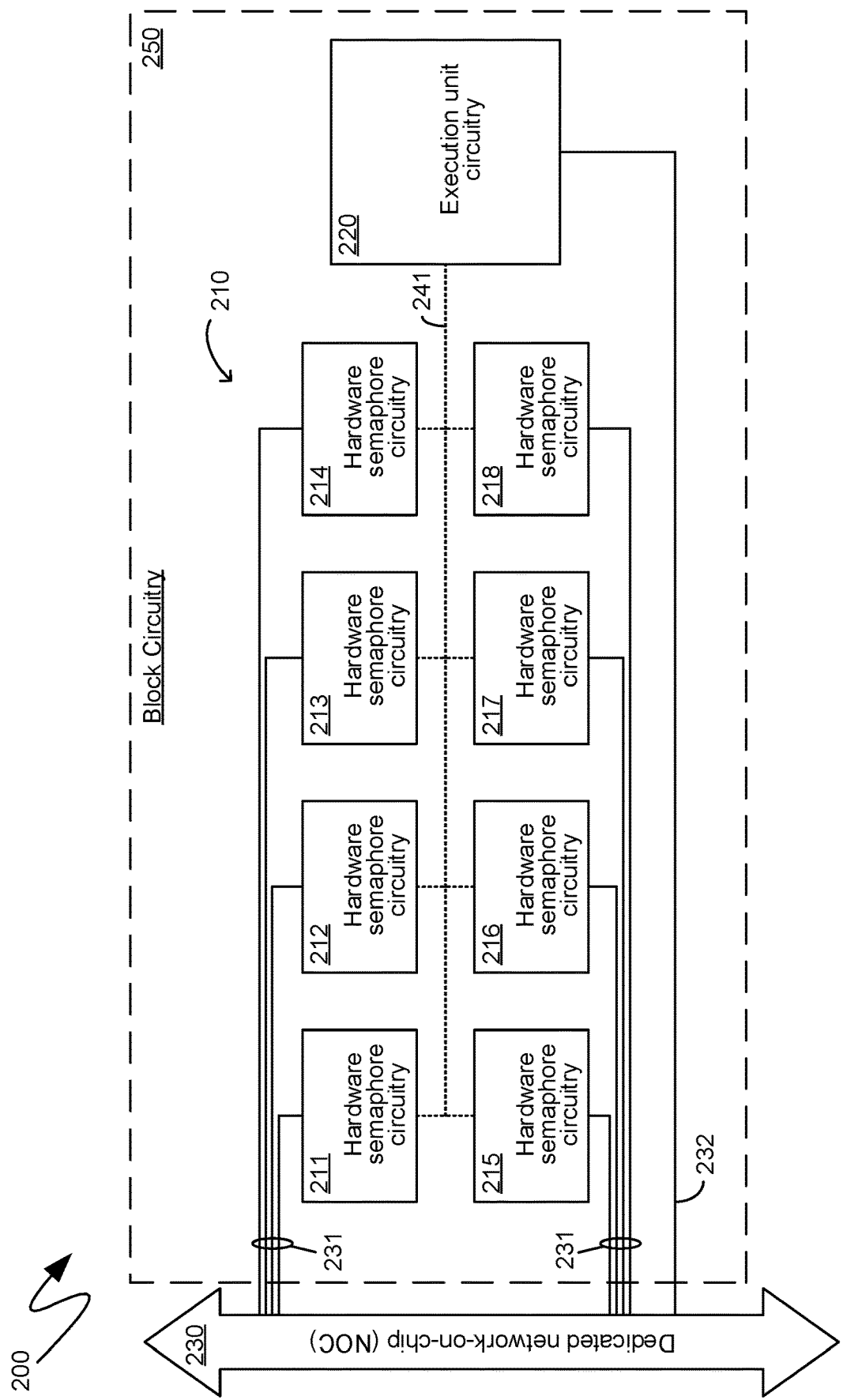
FIG. 2 is a system diagram of an exemplary block circuitry comprising hardware semaphore circuitry and associated execution unit circuitry.

Turning to FIG. 2, the system 200 shown therein illustrates an exemplary interrelationship between execution unit circuitry, such as the exemplary execution unit circuitry 220, and an array of hardware semaphore circuitry, such as the exemplary array of hardware semaphore circuitry 210. The exemplary interrelationship is in the form of the block circuitry 250, which comprises the execution unit circuitry 220 and the hardware semaphore circuitry of the hardware semaphore array 210, in combination with communicational pathways, such the exemplary communicational connections 231, 232 and 241, as well as any other circuitry necessary to facilitate the implementation of the communications and operations described below. Although illustrated as a single execution unit circuitry 220, the exemplary block circuitry 250 can comprise multiple execution unit circuitries coupled to the hardware semaphore array 210.

Each hardware semaphore circuitry, such as the exemplary hardware semaphore circuitry 211, can comprise circuitry that can implement a hardware semaphore that represents a dependency for a consumer process. As detailed above, individual processes can require specific inputs in order to execute properly and generate output and/or can require that specific memory be available to store output prior to generating such output. In the case of required inputs, the required inputs can often be the outputs of preceding processes. As utilized herein, the term "consumer process" will be utilized to refer to a process that accepts, as input, data, including data that is generated by a preceding process, and the term "producer process" will be utilized to refer to the preceding process that generates the data. Stated differently, the producer process outputs data that is utilized as the input to a consumer process. In a serial processing environment, the consumer process cannot execute until the producer process has completed execution, since there may only be a single thread executing at any one time. By contrast, in parallel processing environments, processing capability exists to execute both the producer and consumer processes simultaneously.

A hardware semaphore, therefore, provides a hardware implementation of a software semaphore, including acting as a signal indicating when specified preconditions have been achieved, such as the output of data by a producer process that is a necessary input to a consumer process, or such as the freeing of memory that is to be utilized to store the output of the consumer process. In such a manner, the consumer process can avoid commencing execution until the specified preconditions have been achieved, thereby allowing the consumer process to have access to its required input data and/or its output data storage location. According to one aspect, a hardware semaphore can be implemented with circuitry that provides for the storage of one or more bits of digital data in combination with support circuitry that enables the receipt of hardware semaphore commands, such as will be detailed further below, and carries out those commands, including the modification of the digital data stored by the hardware semaphore. The digital data stored by the hardware semaphore can represent various states being maintained by the hardware semaphore, which can correspond to the states of one or more outputs of producer processes, or other specified preconditions.

When a programmed precondition is met, as represented by the binary data stored by the hardware semaphore, an interrupt or other like notification can be generated by the hardware semaphore circuitry, such as to notify a consumer process that its precondition, as represented by the hardware semaphore circuitry, has been met. As a simple example, if a consumer process requires a producer process to generate output data, the hardware semaphore circuitry can include a single bit whose value can represent the state of the output data generation by the producer process. For example, a binary value of "zero" can represent that the output data has not yet been generated by the producer process. When the producer process produces the output data, a semaphore command can be generated, including by the producer process itself, causing the binary value stored by the hardware semaphore circuitry to be incremented. The binary value of "one", then, can represent that the output data has, indeed, been generated by the producer process. Moreover, the hardware semaphore circuitry can include circuitry that can detect that the stored value, "one" in this simple example, meets the precondition that the hardware semaphore circuitry was programmed, initialized or otherwise set to represent, and, accordingly, can generate an interrupt or other like notification that the dependency represented by the hardware semaphore circuitry has been satisfied.

According to one aspect, execution unit circuitry, such as the exemplary execution unit circuitry 220, can be a core or other like collection of circuitries capable of executing a defined set of instructions. Such execution unit circuitry 220 can be associated with one or more hardware semaphore circuitry, such as the exemplary array of hardware semaphore circuitry 210, with the combination of the execution unit circuitry 220 and the array of hardware semaphore circuitry 210 being encapsulated in the block circuitry 250. According to one aspect, a physical interconnect, such as the exemplary wiring 241, can communicationally couple the execution unit circuitry 220 to the individual hardware semaphore circuitry 211, 212, 213, 214, 215, 216, 217 and 218 of the hardware semaphore array 210. The wiring 241 can enable any one or more of the individual hardware semaphore circuitries, such as the exemplary hardware semaphore circuitry 211, to communicate with, as well as to read and/or write data into, the memories of any one or more other of the individual hardware semaphore circuitries.

Alternatively, or in addition, the hardware semaphore circuitry can be communicationally coupled to other execution unit circuitry through a dedicated Network-On-Chip (NOC). As utilized herein, the adjective "dedicated" means "to the exclusion of other uses", such that the dedicated NOC is an NOC that is utilized to transmit semaphore commands, and other hardware semaphore related messages, to the exclusion of other types of communications. The NOC can be a packet-based network that can be implemented within a single integrated circuit. In such an implementation, individual circuitry can represent aspects of traditional packet-based networks, including endpoint transmit/receive functionality and intermediary routing functionality. The communicational coupling between individual ones of the array of hardware semaphore circuitry 210 and the exemplary dedicated NOC 230 of the system 200 is illustrated in FIG. 2 by the wiring 231, or other like hardware communication coupling. In an analogous manner, to facilitate communication with other hardware semaphore circuitry, such as to notify other hardware semaphore circuitry that a producer process executing on the execution unit circuitry 220 has completed execution and has generated output, the execution unit circuitry 220 can also be communicationally coupled to the dedicated NOC 230, such as is illustrated by the wiring 232, or other like hardware communication coupling.

According to one aspect, semaphore commands can be sent to a semaphore from any source, including producer processes, and as will be detailed below, other semaphores. By contrast, interrupts generated by a semaphore, or other like notifications, can only be sent to the execution unit circuitry with which such a semaphore is specifically associated, such as within a single block or super-block. For example, within the exemplary system 200 shown in FIG. 2, the exemplary hardware semaphore circuitry 211 can, for example, receive semaphore messages from any source, but can only generate an interrupt to a process executing on the execution unit circuitry 220.

Messages exchanged on the dedicated NOC 230 can comprise destination addresses, and, accordingly, each of the individual hardware semaphore circuitry 211 can have a unique address assigned to it. Execution unit circuitry, such as the exemplary execution unit circuitry 220, can also have unique addresses assigned thereto. As such, a message to a hardware semaphore circuitry can comprise the destination address of such a message, as well as one or more commands to the destination hardware semaphore circuitry. Such semaphore commands include initialization commands to reset the hardware semaphore circuitry, setting commands that can establish initial values or other like settings, and data access and modification commands, which can include commands to increment and/or decrement values currently stored by the hardware semaphore circuitry, and commands to read current values stored by the hardware semaphore circuitry.

According to one aspect, individual hardware semaphore circuitry, such as the individual hardware semaphore circuitry 211, can implement a binary semaphore or a counting semaphore. The binary semaphore can represent the presence, or absence, of a single precondition, such as a single output from a single producer process. As such, the binary semaphore can have a value of zero ("off") or one ("on"). By contrast, a counting semaphore can represent a quantity of a precondition, including, for example, a quantity of output data units generated by a single producer process, a quantity of output data generated in aggregate by individual producer processes, or combinations thereof. A counting semaphore, accordingly, can maintain differing states that extend beyond merely zero ("off") or one ("on"). For example, such states can include an initialized state, as well as other states that can represent whole numbers or other like counting representations.

A single hardware semaphore array, such as the exemplary hardware semaphore array 210, can include multiple binary semaphores and multiple counting semaphores. For example, the exemplary hardware semaphore circuitry 211, 212, 213 and 214 can all be binary semaphores, while the exemplary hardware semaphore circuitry 215, 216, 217 and 218 can all be counting semaphores. While the exemplary hardware semaphore array 210 is illustrated as comprising eight hardware semaphores, hardware semaphore arrays can comprise two or more hardware semaphore circuitries, and need not comprise an even number quantity of hardware semaphore circuitries. Additionally, the quantity of binary hardware semaphore circuitries within an array need not be equal to the quantity of counting hardware semaphore circuitries, and various quantities of both binary hardware semaphore circuitries and counting hardware semaphore circuitries can be included in a hardware semaphore array.

Figure 3A:
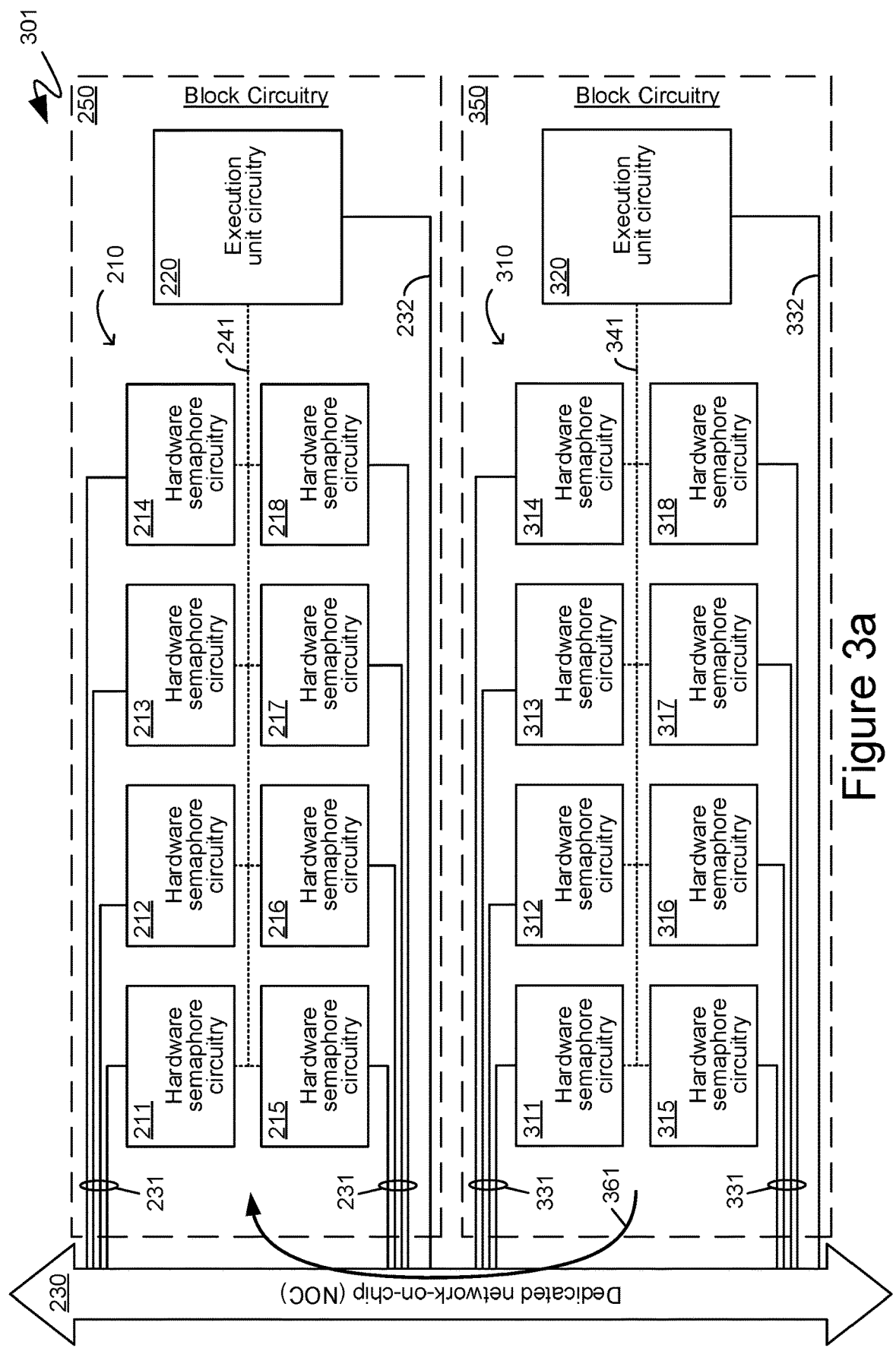
FIGS. 3a-3b are block diagrams of exemplary aggregations of multiple block circuitry.

Turning to FIG. 3a, the exemplary system 301 shown therein illustrates an exemplary amalgamation of multiple block circuitry, such as the exemplary block circuitry 250, originally shown in FIG. 2, and described in detail above. For example, multiple block circuitry can be amalgamated within a single integrated circuit, such as a computer chip, in that the integrated circuit can comprise multiple execution unit circuitry to provide for parallel processing, and multiple ones of those execution unit circuitries can be associated with hardware semaphore arrays, such as was detailed above. Within the exemplary system 301, shown in FIG. 3a, the exemplary block circuitry 250 is amalgamated with another block circuitry 350, such as on a single substrate, a single integrated circuit, or other like amalgamation. The exemplary block circuitry 350, like the exemplary block circuitry 250 detailed above, can comprise one or more execution unit circuitries, such as the exemplary execution unit circuitry 320, as well as associated hardware semaphore circuitries, such as in the form of the hardware semaphore circuitries 311, 312, 313, 314, 315, 316, 317 and 318, which can comprise a hardware semaphore array 310. The hardware semaphore circuitries of the hardware semaphore array 310 and the execution unit circuitry 320 can be communicationally coupled through wiring 341, or other like communicational pathways, and can also comprise communicational connections to the dedicated NOC 230, such as the exemplary communication connections 331 and 332.

According to one aspect, communications between the block circuitry 250 and the block circuitry 350 can be via the dedicated NOC 230. For example, execution unit circuitry 320 can execute a producer process whose output is a precondition for the execution of a consumer process, such as, for example, on the execution unit circuitry 220. In such an instance, execution unit circuitry 320 can communicate with one or more of the hardware semaphore circuitry 210 of the block circuitry 250, such as by sending a hardware semaphore message to, for example, the hardware semaphore circuitry 211, signifying an event that affects the precondition of the execution of the consumer process on the execution unit circuitry 220. For example, the execution unit circuitry 320 can generate a hardware semaphore message, addressed to the hardware semaphore circuitry 211, comprising a hardware semaphore command for the hardware semaphore circuitry 211 to increment. If, for example, the hardware semaphore circuitry 211 was implementing a binary semaphore, such a command can cause the hardware semaphore circuitry 211 to transition from a "zero" state to a "one" state, indicating that the producer process, whose output is a precondition for the execution of the consumer process on the execution unit circuitry 220, has produced the output that is the precondition.

In addressing the hardware semaphore message to the hardware semaphore circuitry 211, the process executing on the execution unit circuitry 320 can utilize an addressing scheme in accordance with the implementation of the dedicated NOC 230. For example, the addressing scheme can be in accordance with standard Internet Protocol (IP) addressing. As another example, the addressing scheme can be in accordance with other standardized network addressing schemes. Within the addressing scheme being utilized to implement the dedicated NOC 230, each of the addresses within a block circuitry can comprise a single subnet. Accordingly, in such an exemplary addressing scheme, communication from the execution unit circuitry 320 to the hardware semaphore circuitry 211 can comprise inter-subnet communications, which can proceed through the routing provided by the dedicated NOC 230, such as is illustrated by the communication 361.

Figure 3B:
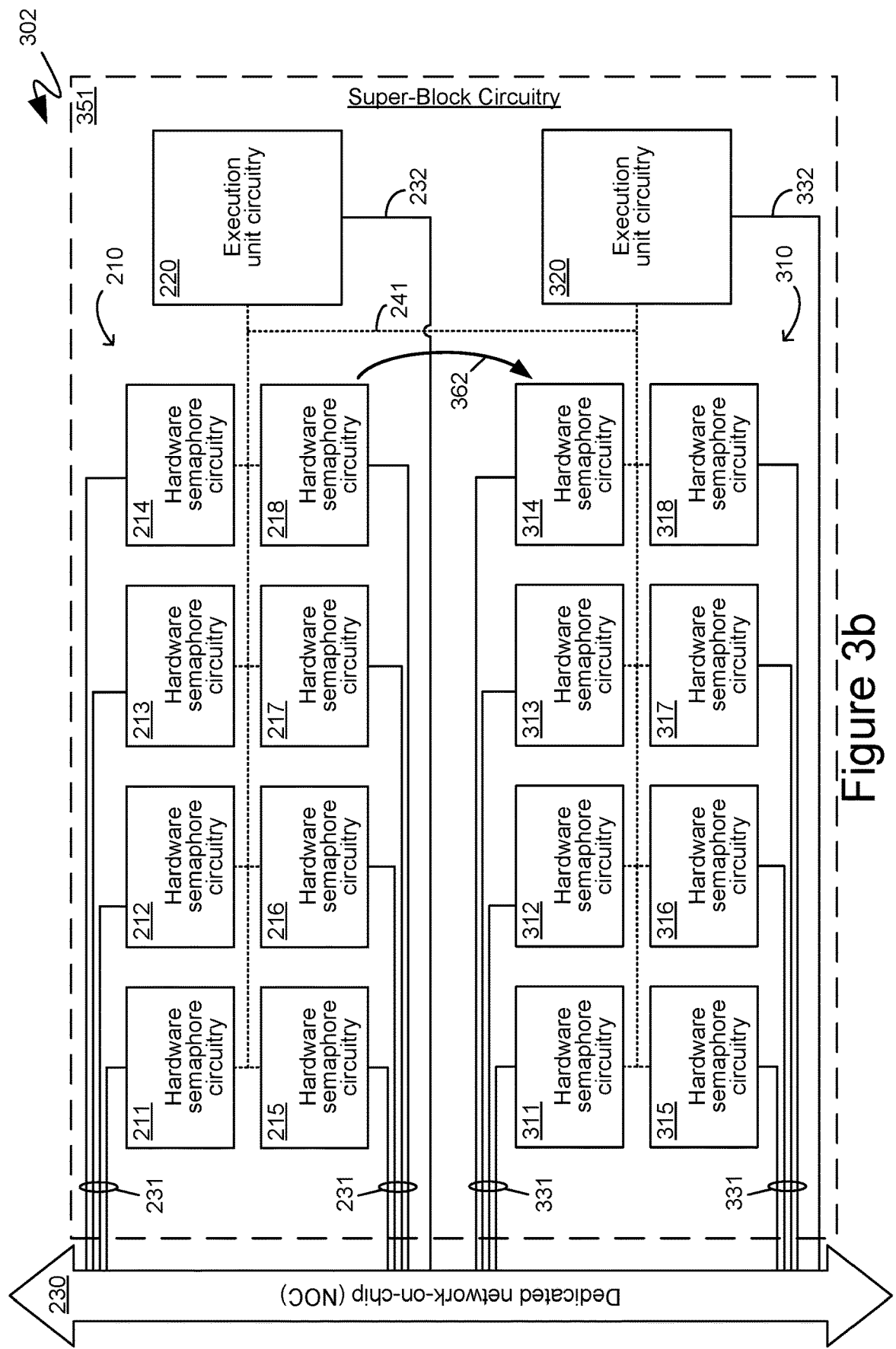

Turning to FIG. 3b, the exemplary system 302 shown therein illustrates an alternative exemplary amalgamation of multiple block circuitry. More specifically, the exemplary system 302 illustrates an exemplary super-block circuitry, such as the super-block circuitry 351. According to one aspect, a super-block can comprise multiple instances of block circuitry interconnected together through communicational pathways, such as the exemplary communicational pathway 241, which can communicationally couple the execution unit circuitries 220 and 320, as well as the individual hardware semaphore circuitries 211, 212, 213, 214, 215, 216, 217, 218, 311, 312, 313, 314, 315, 316, 317 and 318. A super-block, such as the exemplary super-block circuitry 351, can comprise a hierarchically higher level within a hierarchically arranged integrated circuit, chip, substrate, or the like. For example, individual block circuitries can be amalgamated into super-block circuitries, such as in the manner shown. Multiple super-block circuitries can then be amalgamated on the integrated circuit chip, or can be amalgamated into still higher hierarchical levels, which can then be amalgamated on an integrated circuit chip.

One difference between the amalgamation illustrated by the exemplary system 301 and that illustrated by the exemplary system 302 can be the utilization of the hardware semaphore circuitries by processes executing on the execution unit circuitries. For example, in the exemplary system 301, the individual hardware semaphore circuitries 211, 212, 213, 214, 215, 216, 217 and 218 could generate an interrupt for a process executing on the execution unit circuitry 220, but not for a process executing on the execution unit circuitry 320, and analogously, the individual hardware semaphore circuitries 311, 312, 313, 314, 315, 316, 317 and 318 could generate an interrupt for a process executing on the execution unit circuitry 320, but not for a process executing on the execution unit circuitry 220. By contrast, in the exemplary system 302, the individual hardware semaphore circuitries 211, 212, 213, 214, 215, 216, 217 and 218 could generate an interrupt for a process executing on either the execution unit circuitry 220 or the execution unit circuitry 320, as can, equally, the individual hardware semaphore circuitries 311, 312, 313, 314, 315, 316, 317 and 318. Additionally, as will be detailed further below, in a hardware semaphore circuitry chain, one hardware semaphore circuitry can directly modify values retained by another hardware semaphore circuitry. Within the exemplary system 301, such modification could be performed among the individual hardware semaphore circuitries 211, 212, 213, 214, 215, 216, 217 and 218, to the exclusion of the individual hardware semaphore circuitries 311, 312, 313, 314, 315, 316, 317 and 318, and vice versa as well. By contrast, within the exemplary system 302, such modification could be performed among any of the individual hardware semaphore circuitries 211, 212, 213, 214, 215, 216, 217, 218, 311, 312, 313, 314, 315, 316, 317 and 318. Thus, for example, within the exemplary system 301, a semaphore chain could be implemented across the individual hardware semaphore circuitries 211, 212, 213, 214, 215, 216, 217 and 218, to the exclusion of the individual hardware semaphore circuitries 311, 312, 313, 314, 315, 316, 317 and 318, while, within the exemplary system 302, a semaphore chain could be implemented across any of the individual hardware semaphore circuitries 211, 212, 213, 214, 215, 216, 217, 218, 311, 312, 313, 314, 315, 316, 317 and 318. Accordingly, a hardware semaphore circuitry, such as the exemplary hardware semaphore circuitry 218, can directly modify values of another hardware semaphore circuitry, such as the exemplary hardware semaphore circuitry 314, without communicating across the dedicated NOC 230, and, instead, utilizing the communicational pathways 241, as illustrated by the communication 362.

Figure 4A:
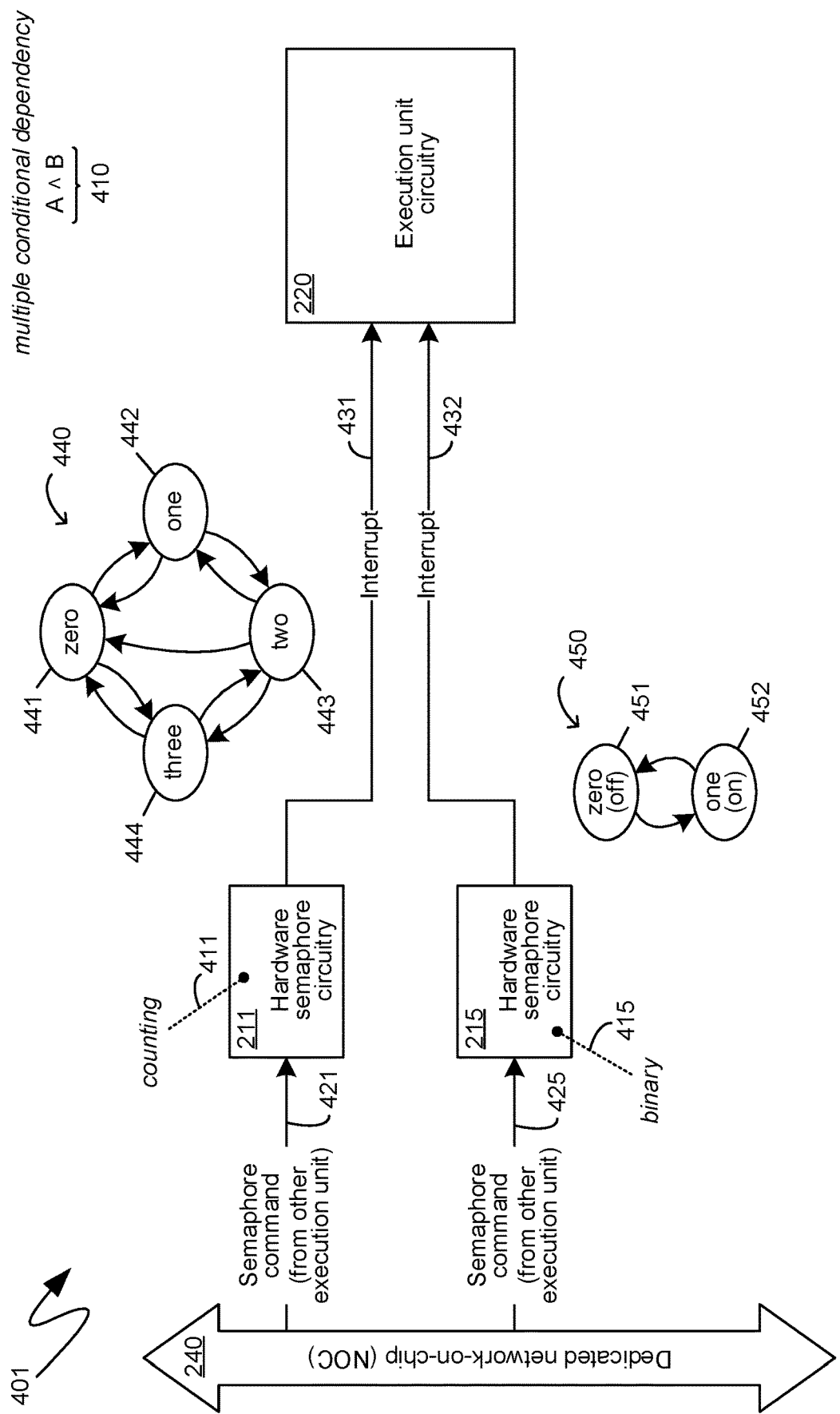
FIGS. 4a-4b are block diagrams of exemplary handling of multiple conditionals utilizing hardware semaphore circuitry.

A hardware semaphore chain can enable hardware semaphores to support multiple conditionals. Turning first to FIG. 4a, the exemplary system 401 shown therein illustrates an exemplary operation of individual hardware semaphore circuitry, such as within the context of the system 200 shown in FIG. 2 and described in detail above. In the exemplary system 401, the hardware semaphore circuitry 215 implements a binary semaphore. Accordingly, the hardware semaphore circuitry 215 can implement a state machine, such as the exemplary state machine 450, having an off (or zero) state 451 and an on (or one) state 452. By contrast, the exemplary hardware semaphore circuitry 211 can implement a counting semaphore. Within the exemplary system 401 illustrated in FIG. 4a, the hardware semaphore circuitry 211 can have been set to count to a quantity of three. For example, a dependency, implemented by the hardware semaphore circuitry 211, can be for three outputs of a single producer process. As another example, a consumer process can have a precondition, implemented by the hardware semaphore circuitry 211, that can require three separate data as input, with such input data being generated by one or more producer processes. Accordingly, the hardware semaphore circuitry 211 can implement a state machine, such as the exemplary state machine 440, having individual states that can represent quantities in accordance with the defined precondition represented by the hardware semaphore circuitry 211. Such individual quantity states can include the state 441, representing a zero quantity, the state 442, representing a quantity of one, the state 443, representing a quantity of two and the state 444, representing a quantity of three.

The arrows illustrated in the state machines 450 and 440 can represent the transitions between states. Within the exemplary state machine 450, for example, a notification that a represented state has changed, such as, for example, a notification that an output has been generated, can cause the state machine 450 to transition from the state 451 to the state 452. As another example, a reset of the hardware semaphore circuitry 215 can cause the state machine 450 to transition back to an initial state, such as, for example, the state 451. Such notifications, resets, or other like commands or information directed to the hardware semaphore circuitry 215 can be delivered in the form of messages, such as those detailed above. The exemplary system 401 illustrates one such message in the form of the exemplary message 425 received through the dedicated NOC 230. In an analogous manner, if the exemplary state machine 440, for example, receives a notification that a represented state has changed, such as, for example, a notification that one output has been generated, such a message can cause the state machine 440 to transition from a prior state to subsequent state representing an increment of one. Such a transition could, for example, be from the state 441 to the state 442, from the state 442 to the state 443 or from the state 443 to the state 444. Analogously, a notification that a represented state has changed in opposite manner, such as, for example, a notification that a previously generated output was reset, or otherwise deleted, can cause the state machine 340 to transition from a prior state to a subsequent state representing a decrement of one. Such a transition could, for example, be from the state 443 to the state 442 or from the state 442 to the state 441. Additionally, a reset of the hardware semaphore circuitry 211 can cause the state machine 440 transition from any one of the states 442, 443 or 444 to the state 441, as illustrated by the arrows shown in FIG. 4a. Again, notifications, resets, or other like commands or information directed to the hardware semaphore circuitry 211 can be delivered in the form of messages, such as the exemplary messages 421 received from the dedicated NOC 230.

According to one aspect, various mechanisms described herein can be implemented by compilers when generating computer-executable instructions, such as in accordance with custom or limited instruction sets executable by execution unit circuitry of an integrated circuit chip, such as that designed in accordance with the descriptions provided herein. For example, human-readable programming instructions can specify preconditions or dependencies for processes, threads, or other like units of execution. During compilation, such specifications can be detected by a compiler and such a compiler can set one or more hardware semaphores, such as in the manner detailed herein. Such setting can also include the insertion of computer-executable instructions that can notify the relevant hardware semaphore circuitry of changes in the state of the output of preceding threads or processes that provide the input for subsequent threads or processes. In FIG. 4a, the setting of the hardware semaphore circuitry 211 as a counting semaphore, maintaining the exemplary state machine 440, is illustrated by the initialization action 411. Similarly, the setting of the hardware semaphore circuitry 215 as a binary semaphore, maintaining the exemplary state machine 450, is illustrated by the initialization action 415.

As detailed above when the hardware semaphore circuitry reaches a state that is indicative of a determined precondition, in accordance with the settings with which the hardware semaphore circuitry was initialized, the hardware semaphore circuitry can generate an interrupt to trigger execution, or modify existing execution, of a process, thread, or other like execution of computer executable instructions on a processor core or other like execution unit circuitry. Thus, for example, the exemplary hardware semaphore circuitry 211 can generate the interrupt 431 directed at a process being executed by the execution unit circuitry 220. More specifically, the exemplary hardware semaphore circuitry 211, upon transitioning from the state 443 to the state 444 can cause the interrupt 431 to be generated. As another example, the exemplary hardware semaphore circuitry 215 can have been set to trigger an interrupt when it transitions to the on state 452.

According to one aspect, a multiple conditional dependency, such as the multiple conditional dependency 410, can be represented by two hardware semaphores, such as the exemplary hardware semaphore circuitries 211 and 215, which can, then, generate the corresponding interrupts, namely the interrupts 431 and 432. For example, the multiple conditional dependency 410 can be the form of "A and B", requiring that both condition "A" and condition "B" be satisfied prior to the execution of the thread, such as by the execution unit circuitry 220. Conditions "A" and "B" can be conditions that can be represented by two binary hardware semaphore circuitries, two counting hardware semaphore circuitries, or one binary and one counting hardware semaphore circuitry.

In the case of a conditional dependency referencing two or more states, the receipt of one interrupt, such as the exemplary interrupt 331, can result in the continued waiting for the second interrupt, such as the exemplary interrupt 335, before proceeding with execution. However, the implementation of a multiple conditional dependency, even as simple a multiple conditional dependency as the exemplary multiple conditional dependency 410, by the process executing on the execution unit circuitry 220 can be costly in that it can require the execution of computer-executable instructions across many clock cycles, adding to the overhead of the execution of the process itself. Consequently, implementation of multiple conditional dependencies within the process itself executing on the execution unit circuitry 220 can be prohibitively slow and inefficient According to one aspect, to accommodate multiple conditional dependencies in a faster and more efficient, as well as less power consuming, manner, a chain semaphore can be created that can link, or otherwise organize in a sequential manner, multiple hardware semaphore circuitries.

Figure 4B:
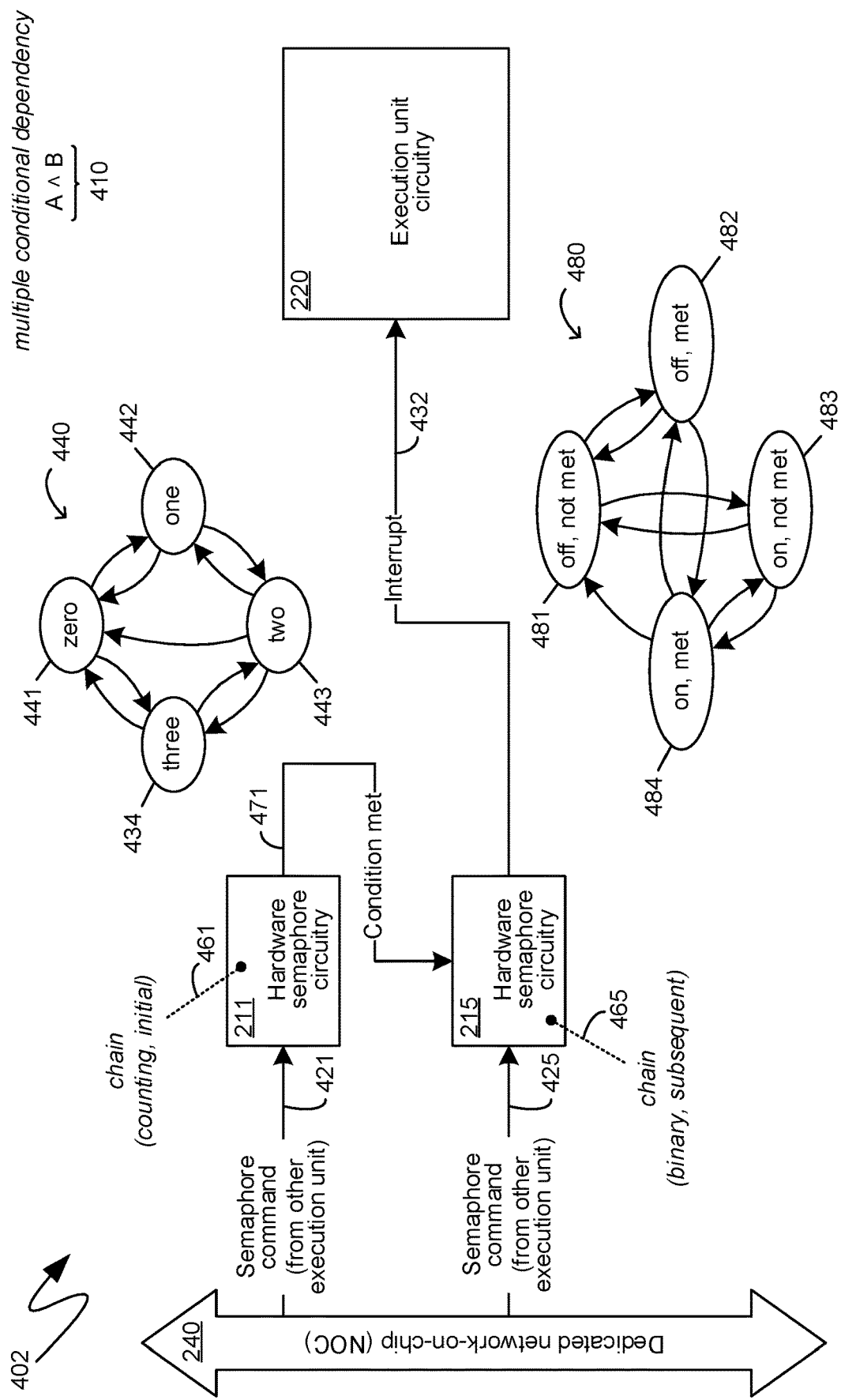

Turning to FIG. 4b, the exemplary system 402 illustrates an exemplary implementation of the same multiple conditional dependency 410 from the exemplary system 401 of FIG. 4a, except now implemented utilizing a semaphore chain implemented utilizing multiple hardware semaphore circuitry. More specifically, an initial hardware semaphore circuitry, of a semaphore chain, such as the exemplary hardware semaphore circuitry 211 can be initialized to be part of a semaphore chain, and, more specifically, to be the first semaphore in the semaphore chain. In addition, the exemplary hardware semaphore circuitry 211 can be initialized to be a counting semaphore, such as it was in the exemplary system 401 described previously. Such an initialization is illustrated by the initialization action 461.

By contrast, the exemplary hardware semaphore circuitry 215 can be initialized to be a subsequent semaphore in the semaphore chain. More specifically, the hardware semaphore circuitry 215 can be initialized so that its state machine takes into account not only the state of whatever process is sending the semaphore commands 425, but also takes into account whether or not the preceding semaphore in the semaphore chain, such as, for example, the hardware semaphore circuitry 211, has reached a condition met state. For example, as in the exemplary system 401, the exemplary hardware semaphore circuitry 215 can implement a binary semaphore. However, as illustrated by the initialization action 465, by being set as a chain semaphore, and, more specifically as a subsequent semaphore in the chain semaphore, even though the exemplary hardware semaphore circuitry 215 is implementing a binary semaphore, the state machine it is maintaining, such as, for example, the exemplary state machine 480, can comprise more than the two states of the exemplary state machine 450 that was shown in FIG. 4a.

As can be seen, for a subsequent semaphore in a semaphore chain, the state machine can include double the quantity of states as a non-chain semaphore of the same type would maintain, since each state of a non-chain semaphore is duplicated in a chain semaphore (other than the first semaphore in the chain) to account for the possibility that the prior condition is either met or not met. Thus, for example, the exemplary binary semaphore being maintained by the hardware semaphore circuitry 215 can be initialized to maintain four states, as illustrated by the exemplary state machine 480. The state 481 can represent an "off" state of the precondition being implemented by another execution unit whose messages to the hardware semaphore circuitry 215 are illustrated by the message 425, and, in addition, the state 481 can further represent that the prior condition, such as the condition "A" being maintained by the prior semaphore in the semaphore chain, such as the exemplary hardware semaphore circuitry 211, has not yet been met. By contrast, the state 482 can represent an "off" state, with the precondition being met. Thus, for example, the hardware semaphore circuitry 215 can maintain a state machine that transitions from state 481 to state 482 if no semaphore command, such as the exemplary semaphore command 425, is received, while a communication is received from the hardware semaphore circuitry 211, implementing a preceding semaphore in the semaphore chain, indicating that its condition is met. In an analogous manner, the exemplary state machine 480 can further comprise states 483 and 484, with state 483 representing an "on" state with the preceding semaphore in the semaphore chain having its preconditions not yet met, and state 484 representing the "on" state with the preceding condition in the semaphore chain being met. Thus, for example, the exemplary state machine 480 can transition from the state 482 to the state 484 upon receipt of the semaphore command 425 if the preceding condition in the semaphore chain is met.

According to one aspect, the condition met notification 471 from the exemplary hardware semaphore circuitry 211, implementing one semaphore in a semaphore chain, to the exemplary hardware semaphore circuitry 215, implementing a subsequent semaphore in the semaphore chain, can be in the form of a semaphore command. According to an alternative aspect, the condition met notification 471 can be a direct action, by the hardware semaphore circuitry 211, upon the hardware semaphore circuitry 215. For example, data stored in a memory area reserved for the hardware semaphore circuitry 215 can be directly modified by the hardware semaphore circuitry 211, with such a modification representing a change in state indicative of the hardware semaphore circuitry 211 having its condition met.

The hardware semaphore circuitry 215, upon reaching state 484, can trigger the interrupt 432. As can be seen from FIG. 4b, however, the state 484 can represent that condition "B", as represented by the "on" portion of the state 484, and as communicated by the message 425, and condition "A", as represented by the "met" portion of the state 484 and as communicated by the notification 471, have been met. In other words, the single interrupt 432 can represent that the multiple conditional dependency 410 has been met. In such a manner, a chain semaphore can support multiple conditionals without burdening the execution unit circuitry 220, such as in the manner of the system 401, as indicated previously.

Figure 5:
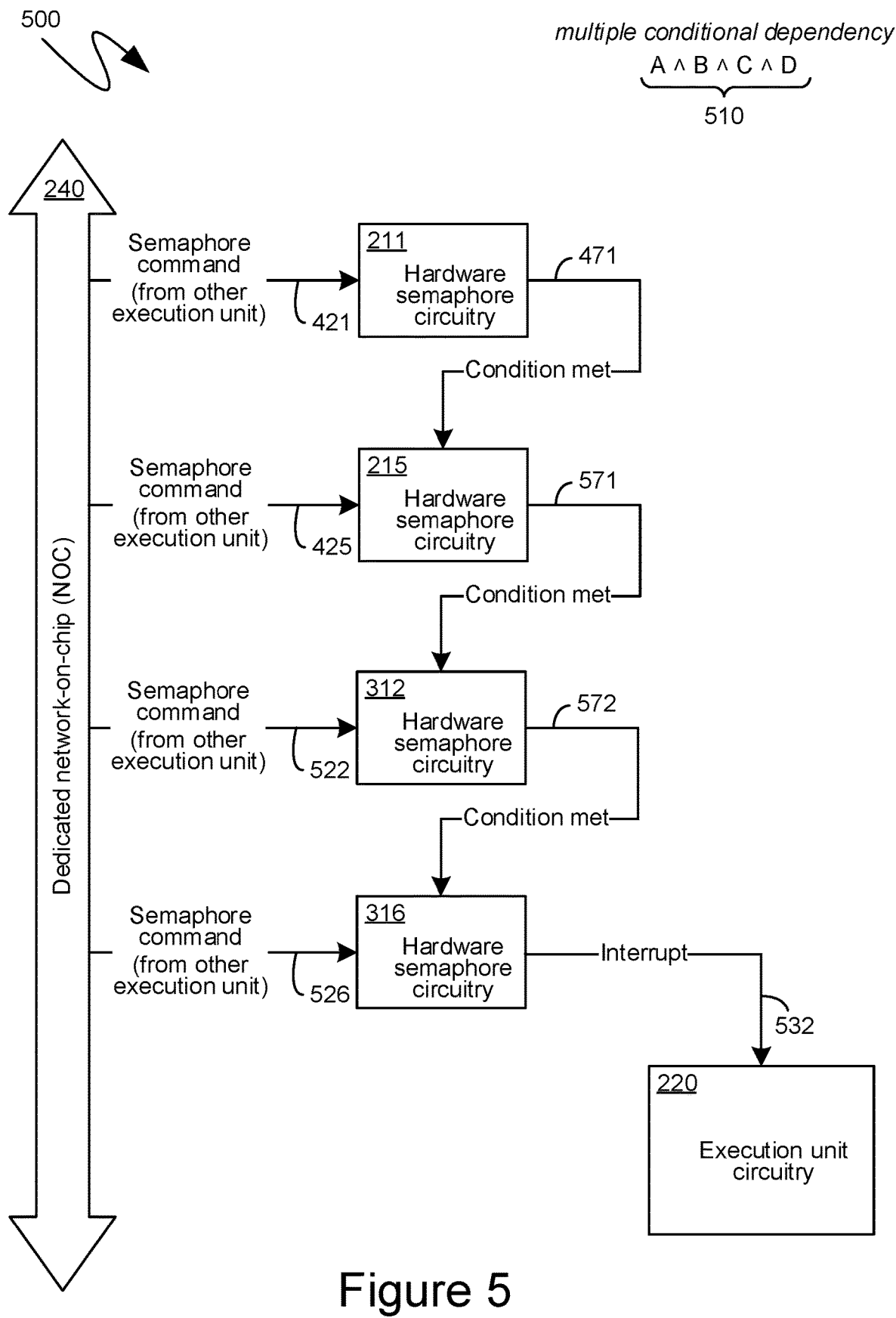
FIG. 5 is a block diagram of an exemplary semaphore chain implemented by hardware semaphore circuitry to support a multiple conditional.

Turning to FIG. 5, the exemplary system 500 shown therein illustrates a multi-semaphore chain supporting the exemplary multiple conditional dependency 510, which can comprise four separate preconditions "A", "B", "C" and "D". In the exemplary system 500, as in the exemplary system 402, the exemplary hardware semaphore circuitry 211 can be initialized to represent a first, or initial, semaphore in a semaphore chain, and can maintain a state machine in accordance with precondition "A". Similarly, the exemplary hardware semaphore circuitry 215 can be initialized to represent a subsequent semaphore in the semaphore chain, and can maintain a state machine in accordance with precondition "B", with that state machine also taking into account whether or not a preceding semaphore in the semaphore chain has indicated that its condition has been met. As such, the exemplary hardware semaphore circuitry 215 can be initialized in the same manner as described above and shown in FIG. 4b. The condition met notification 471 can also be like that described above.

As illustrated above, then, the output of the hardware semaphore circuitry 215 can represent the multiple conditional dependency "A" and "B". However, because the exemplary multiple conditional dependency 510 can be in the form of "A" and "B" and "C" and "D", additional hardware semaphore circuitry can be initialized to implement additional semaphores in the semaphore chain. Just as condition met notification 471 will not be triggered until condition "A" is met, and just as the hardware semaphore circuitry 215 would not have generated an interrupt until the multiple precondition "A" and "B" was met, in an analogous manner, when implementing an intermediate semaphore in a hardware semaphore chain, the hardware semaphore circuitry 215 can wait to generate the condition met notification 571 until both its precondition "B", as well as the one or more preconditions of preceding semaphores in the chain, are both met. In other words, the generation of the condition met notification 571 is indicative of the multiple conditional dependency "A" and "B" being met.

Such a condition met notification 571 can be directed to a hardware semaphore circuitry, such as the exemplary hardware semaphore circuitry 312, that can be initialized implement another subsequent semaphore in the semaphore chain, namely a semaphore that can be associated with the state of the dependency "C". In a manner analogous to that detailed above, upon receiving one or more semaphore commands, such as the exemplary semaphore command 522, indicating that the state of the precondition "C" is such that that precondition is met, and further upon receiving the condition met notification 571, the hardware semaphore circuitry 312 can generate its own condition met notification 572. In a manner analogous to that detailed above, the generation of the condition met notification 572 can be indicative of the multiple conditional dependency "A" and "B" and "C" being met.

Accordingly, a still further hardware semaphore circuitry, such as the exemplary hardware semaphore circuitry 316, can be initialized to implement the last semaphore in a semaphore chain. As such, when the exemplary hardware semaphore circuitry 316 receives one or more semaphore commands, such as the exemplary semaphore command 526, indicating that the state of the precondition "D" is such that that precondition is met, and when the exemplary hardware semaphore circuitry 316 further receives the condition met notification 572 from the hardware semaphore circuitry 312, the hardware semaphore circuitry 316 can generate the interrupt 532, such as to a process being executed on the exemplary execution unit circuitry 220. As can be seen from the above, the generation of the interrupt 532 can be indicative of the multiple conditional dependency "A" and "B" and "C" and "D", namely the exemplary multiple conditional dependency 510, being met. In such a manner, the chain semaphore of FIG. 5 can support the multiple conditional dependency 510 without burdening the execution unit circuitry 220.

Although described above only within the context of interrupts, according to one aspect, hardware semaphore circuitry, such as the exemplary hardware semaphore circuitry 316, can output semaphore commands or other like messages. For example, the exemplary hardware semaphore circuitry 316 can generate an interrupt or other like notification to a processing unit or other like circuitry that can be preprogrammed to transmit the semaphore commands. Alternatively, or in addition, the hardware semaphore circuitry itself can comprise such a processing unit, or other like circuitry, and can select from preprogrammed semaphore commands and/or preprogrammed semaphore addressing for generating an appropriately addressed command message.

As detailed above, the setting of individual hardware semaphore circuitries to form a chain semaphore can be performed by a compiler. For example, the compiler can set each of the individual hardware semaphore circuitries 211, 215, 312 and 316 to perform the actions detailed above. Such setting can include the provision of addressing, or other like identification information, to enable the condition met notifications to be delivered to an appropriate hardware semaphore circuitry, or to modify data in an appropriate range of memory associated with a hardware semaphore circuitry implementing the next semaphore in a semaphore chain.

Figure 6:
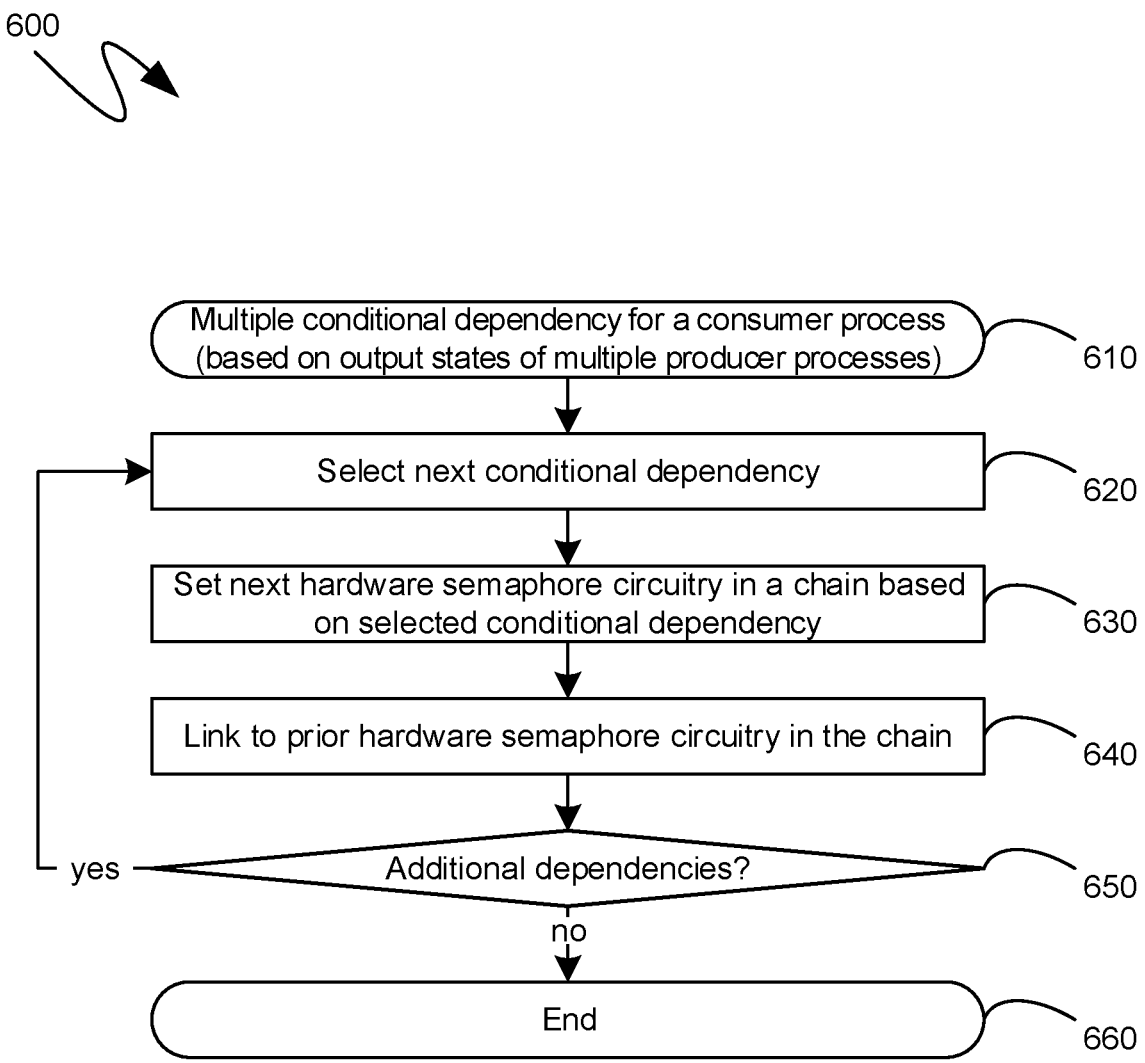
FIG. 6 is a flow diagram of an exemplary establishment of a semaphore chain utilizing hardware semaphore circuitry.

Turning to FIG. 6, an exemplary operation of a compiler creating a chain semaphore utilizing individual hardware semaphore circuitry is illustrated with reference to the exemplary flow diagram 600 shown therein. Initially, at step 610 a statement, such as in a programming language, or other like instructional construct being consumed by the compiler, can be encountered which can specify a multiple conditional dependency for a process, thread, function, or other like set of computer-executable instructions. For ease of reference such a process will be referred to herein as the "consumer process", with the multiple conditional dependency enumerating the logical interrelationships between multiple output states of multiple other processes, threads, functions or other like sets of computer-executable instructions whose output can serve as the input to the consumer process, or which can otherwise service preconditions for the consumer process. For ease of reference such other processes will be referred to herein as the "producer processes".

At step 620, a constituent conditional dependency from the multiple conditional dependency can be selected. At step 630 hardware semaphore circuitry can be sent based on the selected conditional dependency. As part of the setting of such hardware semaphore circuitry, the address, or other like location-identifying information, of down-chain hardware semaphore circuitry can be provided to up-chain hardware semaphore circuitry. Additionally, the addresses, or other like location-identifying information, of such up-chain hardware semaphore circuitry can be provided to the producer processes such that changes in the state of the output thereof can be messaged to the hardware semaphore circuitry. The provision of such hardware semaphore circuitry addresses is illustrated at step 640. At step 650 determination can be made as to whether there are additional dependencies, from the multiple conditional dependency, that have not yet been accommodated by the chain hardware semaphore. If, at step 650, it is determined that such additional dependencies remain un-accommodated, processing can return to step 620, otherwise the relevant processing can end at step 660.

The exemplary flow diagram 600 is illustrated utilizing a linear approach. However, recursive, or backwards operating approaches are equally applicable. For example, and with reference to exemplary system 600 of FIG. 6, a compiler can generate a chain semaphore by first setting the concluding hardware semaphore circuitry, such as the exemplary hardware semaphore circuitry 316. Having set the concluding hardware semaphore circuitry, the compiler can work backwards, such as next setting the exemplary hardware semaphore circuitry 312, with such setting including the provision of the address of the already set concluding hardware semaphore circuitry 316. In such a manner, the compiler can, recursively, proceed backwards setting each of the hardware semaphore circuitries in accordance with the descriptions provided. In such a manner multiple hardware semaphore circuitries can be chained to form a chain semaphore to accommodate multiple conditional dependencies.

The descriptions above include, as a first example a method of utilizing multiple hardware semaphore circuitry as a chain semaphore, the method comprising: receiving computer-executable instructions specifying a multiple conditional dependency for a first consumer process, the multiple conditional dependency enumerating states of outputs of multiple producer processes which are to be met in order for the first consumer process to execute properly; setting a first hardware semaphore circuitry as a first semaphore in the chain semaphore to: maintain a first state machine such that generation of output by a first producer process changes the first state machine, the first producer process being one of the multiple producer processes; and generate a first condition met notification to a subsequent semaphore in the chain semaphore when the first state machine is in a state corresponding to a first condition specified by the multiple conditional dependency; and setting a second hardware semaphore circuitry as the subsequent semaphore in the chain semaphore to: maintain a second state machine such that generation of output by a second producer process changes the second state machine, the second producer process being another one of the multiple producer processes; and generate a second condition met notification when the second state machine is in a state corresponding to: (1) a second condition specified by the multiple conditional dependency and (2) all preceding semaphores in the chain semaphore having generated condition met notifications.

A second example is the method of the first example, wherein the setting of the second hardware semaphore circuitry as the subsequent semaphore in the chain semaphore comprises setting the second hardware semaphore circuitry as a last semaphore in the chain semaphore; and wherein the second condition met notification is an interrupt directed to execution of the first consumer process.

A third example is the method of the first example, wherein the setting of the second hardware semaphore circuitry as the subsequent semaphore in the chain semaphore comprises setting the second hardware semaphore circuitry as a last semaphore in the chain semaphore; and wherein the second condition met notification triggers a semaphore command to a third hardware semaphore circuitry.

A fourth example is the method of the first example, wherein the first producer process executes on a first execution unit circuitry that is communicationally coupled to the first hardware semaphore circuitry, the first execution unit circuitry and the first hardware semaphore circuitry being co-located on an integrated circuit chip.

A fifth example is the method of the fourth example, wherein the first execution unit circuitry generates a command to the first hardware semaphore circuitry, the command causing the state of the first hardware semaphore circuitry to change.

A sixth example is the method of the fourth example, wherein the first hardware semaphore circuitry and the first execution unit circuitry are communicationally coupled by both being part of a first block circuitry on the integrated circuit chip.

A seventh example is the method of the second example, wherein the first execution unit circuitry is communicationally coupled to the first hardware semaphore circuitry through a dedicated network-on-chip (NOC) circuitry.

An eighth example is the method of the seventh example, wherein the first execution unit circuitry is part of a different subnet of the dedicated NOC than the first hardware semaphore circuitry.

A ninth example is the method of the first example, wherein the generation of the first condition met notification by the first hardware semaphore circuitry comprises the first hardware semaphore circuitry modifying one or more values utilized by the second hardware semaphore circuitry to maintain the second state machine.

A tenth example is the method of the first example, wherein the second state machine comprises four states: a first state representative of the second condition not being met and all the preceding semaphores in the chain semaphore not having generated condition met notifications; a second state representative of the second condition being met and all the preceding semaphores in the chain semaphore not having generated condition met notifications; a third state representative of the second condition not being met and all the preceding semaphores in the chain semaphore having generated condition met notifications; and a fourth state representative of the second condition being met and all the preceding semaphores in the chain semaphore having generated condition met notifications.

An eleventh example is an integrated circuit chip comprising: a first execution unit circuitry; a second execution unit circuitry; a first array of hardware semaphore circuitry associated with the first execution unit circuitry; a second array of hardware semaphore circuitry associated with the second execution unit circuitry; a first hardware semaphore circuitry that is set as a first semaphore in a chain semaphore, the first hardware semaphore circuitry: maintaining a first state machine such that generation of output by a first producer process changes the first state machine; and generating a first condition met notification to a subsequent semaphore in the chain semaphore when the first state machine is in a state corresponding to a first condition of a multiple conditional dependency; and a second hardware semaphore circuitry that is set as the subsequent semaphore in the chain semaphore, the second hardware semaphore circuitry: maintaining a second state machine such that generation of output by a second producer process changes the second state machine; and generating a second condition met notification when the second state machine is in a state corresponding to: (1) a second condition specified by the multiple conditional dependency and (2) all preceding semaphores in the chain semaphore having generated condition met notifications.

A twelfth example is the integrated circuit chip of the eleventh example, further comprising: a first block circuitry comprising the first execution unit circuitry and the first array of hardware semaphore circuitry; a second block circuitry comprising the second execution unit circuitry and the second array of hardware semaphore circuitry; and a dedicated network-on-chip (NOC) circuitry communicationally coupling the first block circuitry to the second block circuitry; wherein the first and second hardware semaphore circuitry are part of the first array of hardware semaphore circuitry; and wherein the multiple conditional dependency enumerates states of outputs of multiple producer processes which are to be met in order for a first consumer process to execute properly on the first execution unit.

A thirteenth example is the integrated circuit chip of the twelfth example, wherein the first producer process executes on the second execution unit circuitry and generates a command causing the state of the first hardware semaphore to change, the command being transmitted from the second execution unit circuitry to the first hardware semaphore circuitry via the dedicated NOC.

A fourteenth example is the integrated circuit chip of the twelfth example, wherein elements of the first block circuitry are part of a first subnet of the dedicated NOC and elements of the second block circuitry are part of a second subnet of the dedicated NOC.

A fifteenth example is the integrated circuit chip of the eleventh example, further comprising: a first super-block circuitry comprising the first execution unit circuitry, the first array of hardware semaphore circuitry, the second execution unit circuitry and the second array of hardware semaphore circuitry; and a dedicated network-on-chip (NOC) circuitry communicationally coupling the first super-block circuitry to other super-block circuitry on the integrated circuit chip; wherein the first hardware semaphore circuitry is part of the first array of hardware semaphore circuitry and the second hardware semaphore circuitry is part of the second array of hardware semaphore circuitry.

A sixteenth example is the integrated circuit chip of the eleventh example, wherein the second hardware semaphore circuitry is a last semaphore in the chain semaphore; and wherein the second condition met notification is an interrupt directed to execution of a first consumer process having the multiple conditional dependency as a precondition for execution.

A seventeenth example is the integrated circuit chip of the eleventh example, wherein the second hardware semaphore circuitry is a last semaphore in the chain semaphore; and wherein the second condition met notification triggers a semaphore command to a third hardware semaphore circuitry.

An eighteenth example is an integrated circuit chip comprising: multiple block circuitries, each block circuitry comprising: an execution unit circuitry; and an array of two or more hardware semaphore circuitries; and a dedicated network-on-chip (NOC) circuitry communicationally coupling the multiple block circuitries; wherein at least one block circuitry, of the multiple block circuitries, comprises: a first hardware semaphore circuitry that is set as a first semaphore in a chain semaphore, the first hardware semaphore circuitry: maintaining a first state machine such that generation of output by a first producer process changes the first state machine; and generating a first condition met notification to a subsequent semaphore in the chain semaphore when the first state machine is in a state corresponding to a first condition of a multiple conditional dependency; and a second hardware semaphore circuitry that is set as the subsequent semaphore in the chain semaphore, the second hardware semaphore circuitry: maintaining a second state machine such that generation of output by a second producer process changes the second state machine; and generating a second condition met notification when the second state machine is in a state corresponding to: (1) a second condition specified by the multiple conditional dependency and (2) all preceding semaphores in the chain semaphore having generated condition met notifications.

A nineteenth example is the integrated circuit chip of the eighteenth example, wherein the second hardware semaphore circuitry is a last semaphore in the chain semaphore; and wherein the second condition met notification is an interrupt directed to execution of a first consumer process having the multiple conditional dependency as a precondition for execution.

A twentieth example is the integrated circuit chip of the eighteenth example, wherein the second hardware semaphore circuitry is a last semaphore in the chain semaphore; and wherein the second condition met notification triggers a semaphore command to a third hardware semaphore circuitry.

As can be seen from the above descriptions, mechanisms by which semaphore chains implemented by hardware semaphore circuitry are utilized to support multiple conditionals have been presented. In view of the many possible variations of the subject matter described herein, we claim as our invention all such embodiments as may come within the scope of the following claims and equivalents thereto.

We claim:

1. A method of utilizing multiple hardware semaphore circuitry as a chain semaphore, the method comprising:
   receiving computer-executable instructions specifying a multiple conditional dependency for a first consumer process, the multiple conditional dependency enumerating states of outputs of multiple producer processes which are to be met in order for the first consumer process to execute properly;
   setting a first hardware semaphore circuitry as a first semaphore in the chain semaphore to:
      maintain a first state machine such that generation of output by a first producer process changes the first state machine, the first producer process being one of the multiple producer processes; and
      generate a first condition met notification to a subsequent semaphore in the chain semaphore when the first state machine is in a state corresponding to a first condition specified by the multiple conditional dependency; and
   setting a second hardware semaphore circuitry as the subsequent semaphore in the chain semaphore to:
      maintain a second state machine such that generation of output by a second producer process changes the second state machine, the second producer process being another one of the multiple producer processes; and generate a second condition met notification when the second state machine is in a state corresponding to: (1) a second condition specified by the multiple conditional dependency and (2) all preceding semaphores in the chain semaphore having generated condition met notifications.

2. The method of claim 1, wherein the setting of the second hardware semaphore circuitry as the subsequent semaphore in the chain semaphore comprises setting the second hardware semaphore circuitry as a last semaphore in the chain semaphore; and
wherein the second condition met notification is an interrupt directed to execution of the first consumer process.

3. The method of claim 1, wherein the setting of the second hardware semaphore circuitry as the subsequent semaphore in the chain semaphore comprises setting the second hardware semaphore circuitry as a last semaphore in the chain semaphore; and
wherein the second condition met notification triggers a semaphore command to a third hardware semaphore circuitry.

4. The method of claim 1, wherein the first producer process executes on a first execution unit circuitry that is communicationally coupled to the first hardware semaphore circuitry, the first execution unit circuitry and the first hardware semaphore circuitry being co-located on an integrated circuit chip.

5. The method of claim 4, wherein the first execution unit circuitry generates a command to the first hardware semaphore circuitry, the command causing the state of the first hardware semaphore circuitry to change.

6. The method of claim 4, wherein the first hardware semaphore circuitry and the first execution unit circuitry are communicationally coupled by both being part of a first block circuitry on the integrated circuit chip.

7. The method of claim 4, wherein the first execution unit circuitry is communicationally coupled to the first hardware semaphore circuitry through a dedicated network-on-chip (NOC) circuitry.

8. The method of claim 7, wherein the first execution unit circuitry is part of a different subnet of the dedicated NOC than the first hardware semaphore circuitry.

9. The method of claim 1, wherein the generation of the first condition met notification by the first hardware semaphore circuitry comprises the first hardware semaphore circuitry modifying one or more values utilized by the second hardware semaphore circuitry to maintain the second state machine.

10. The method of claim 1, wherein the second state machine comprises four states:
a first state representative of the second condition not being met and all the preceding semaphores in the chain semaphore not having generated condition met notifications;
a second state representative of the second condition being met and all the preceding semaphores in the chain semaphore not having generated condition met notifications;
a third state representative of the second condition not being met and all the preceding semaphores in the chain semaphore having generated condition met notifications; and
a fourth state representative of the second condition being met and all the preceding semaphores in the chain semaphore having generated condition met notifications.

11. An integrated circuit chip comprising:
a first execution unit circuitry;
a second execution unit circuitry;
a first array of hardware semaphore circuitry associated with the first execution unit circuitry;
a second array of hardware semaphore circuitry associated with the second execution unit circuitry;
a first hardware semaphore circuitry that is set as a first semaphore in a chain semaphore, the first hardware semaphore circuitry:
maintaining a first state machine such that generation of output by a first producer process changes the first state machine; and
generating a first condition met notification to a subsequent semaphore in the chain semaphore when the first state machine is in a state corresponding to a first condition of a multiple conditional dependency; and
a second hardware semaphore circuitry that is set as the subsequent semaphore in the chain semaphore, the second hardware semaphore circuitry:
maintaining a second state machine such that generation of output by a second producer process changes the second state machine; and
generating a second condition met notification when the second state machine is in a state corresponding to: (1) a second condition specified by the multiple conditional dependency and (2) all preceding semaphores in the chain semaphore having generated condition met notifications.

12. The integrated circuit chip of claim 11, further comprising:
a first block circuitry comprising the first execution unit circuitry and the first array of hardware semaphore circuitry;
a second block circuitry comprising the second execution unit circuitry and the second array of hardware semaphore circuitry; and
a dedicated network-on-chip (NOC) circuitry communicationally coupling the first block circuitry to the second block circuitry;
wherein the first and second hardware semaphore circuitry are part of the first array of hardware semaphore circuitry; and
wherein the multiple conditional dependency enumerates states of outputs of multiple producer processes which are to be met in order for a first consumer process to execute properly on the first execution unit.

13. The integrated circuit chip of claim 12, wherein the first producer process executes on the second execution unit circuitry and generates a command causing the state of the first hardware semaphore to change, the command being transmitted from the second execution unit circuitry to the first hardware semaphore circuitry via the dedicated NOC.

14. The integrated circuit chip of claim 12, wherein elements of the first block circuitry are part of a first subnet of the dedicated NOC and elements of the second block circuitry are part of a second subnet of the dedicated NOC.

15. The integrated circuit chip of claim 11, further comprising:
a first super-block circuitry comprising the first execution unit circuitry, the first array of hardware semaphore circuitry, the second execution unit circuitry and the second array of hardware semaphore circuitry; and
a dedicated network-on-chip (NOC) circuitry communicationally coupling the first super-block circuitry to other super-block circuitry on the integrated circuit chip;

wherein the first hardware semaphore circuitry is part of the first array of hardware semaphore circuitry and the second hardware semaphore circuitry is part of the second array of hardware semaphore circuitry.

16. The integrated circuit chip of claim 11, wherein the second hardware semaphore circuitry is a last semaphore in the chain semaphore; and wherein the second condition met notification is an interrupt directed to execution of a first consumer process having the multiple conditional dependency as a precondition for execution.

17. The integrated circuit chip of claim 11, wherein the second hardware semaphore circuitry is a last semaphore in the chain semaphore; and wherein the second condition met notification triggers a semaphore command to a third hardware semaphore circuitry.

18. An integrated circuit chip comprising:
multiple block circuitries, each block circuitry comprising:
an execution unit circuitry; and
an array of two or more hardware semaphore circuitries; and
a dedicated network-on-chip (NOC) circuitry communicationally coupling the multiple block circuitries;
wherein at least one block circuitry, of the multiple block circuitries, comprises:
a first hardware semaphore circuitry that is set as a first semaphore in a chain semaphore, the first hardware semaphore circuitry:
maintaining a first state machine such that generation of output by a first producer process changes the first state machine; and
generating a first condition met notification to a subsequent semaphore in the chain semaphore when the first state machine is in a state corresponding to a first condition of a multiple conditional dependency; and
a second hardware semaphore circuitry that is set as the subsequent semaphore in the chain semaphore, the second hardware semaphore circuitry:
maintaining a second state machine such that generation of output by a second producer process changes the second state machine; and
generating a second condition met notification when the second state machine is in a state corresponding to: (1) a second condition specified by the multiple conditional dependency and (2) all preceding semaphores in the chain semaphore having generated condition met notifications.

19. The integrated circuit chip of claim 18, wherein the second hardware semaphore circuitry is a last semaphore in the chain semaphore; and wherein the second condition met notification is an interrupt directed to execution of a first consumer process having the multiple conditional dependency as a precondition for execution.

20. The integrated circuit chip of claim 18, wherein the second hardware semaphore circuitry is a last semaphore in the chain semaphore; and wherein the second condition met notification triggers a semaphore command to a third hardware semaphore circuitry.

* * * * *